March 24, 1942.     H. HOECK     2,277,402
BELT CONVEYER
Filed April 17, 1940
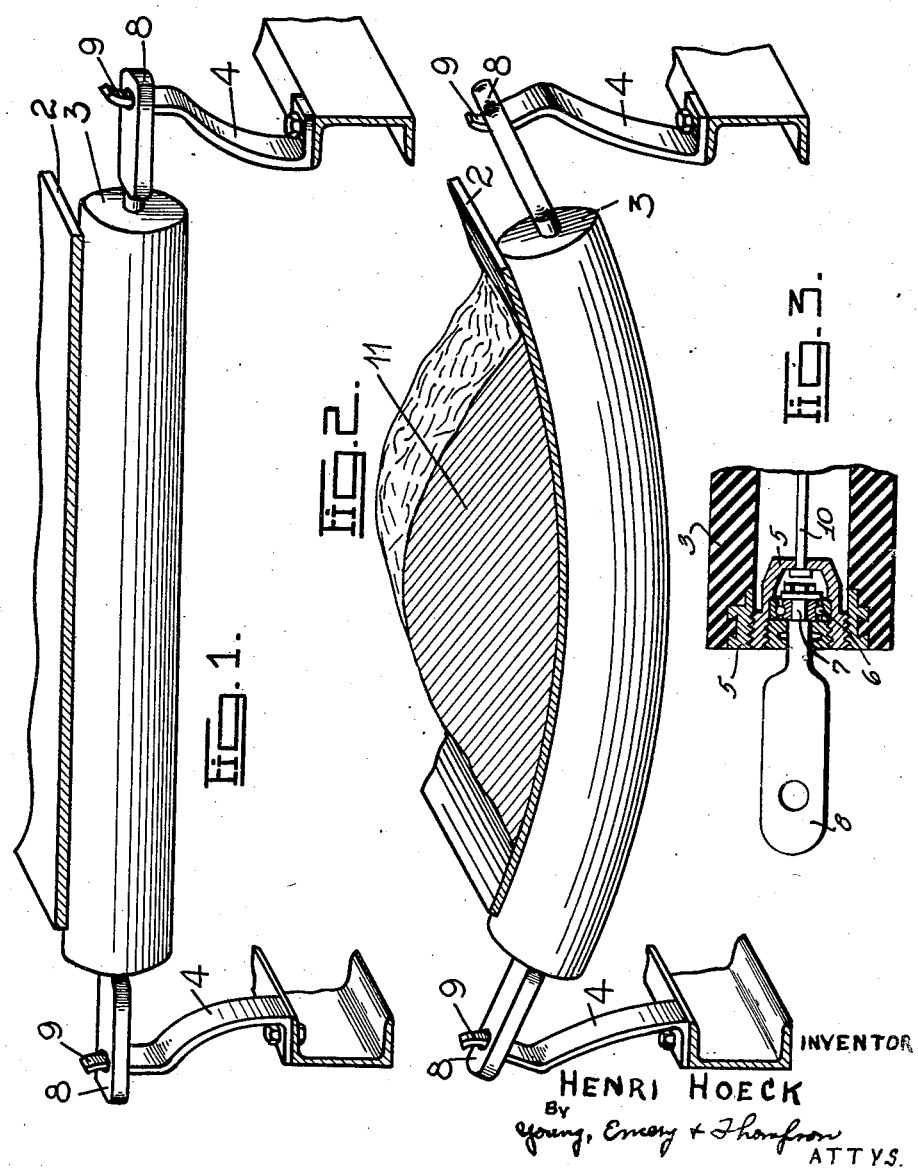
INVENTOR
HENRI HOECK
BY
Young, Emery & Thompson
ATTYS.

Patented Mar. 24, 1942

2,277,402

UNITED STATES PATENT OFFICE 2,277,402

BELT CONVEYER

Henri Hoeck, Gand, Belgium

Application April 17, 1940, Serial No. 330,216
In Belgium April 17, 1939

2 Claims. (Cl. 198—192)

This invention relates to a belt conveyer in which the belt moves over flexible rollers.

When resilient rollers are used, for example helical springs, the belt is liable to deviate sideways and to thrust against its guides, which results in deteriorations. Furthermore, in the case of rollers consisting of springs, the material conveyed is liable to get between the windings of the spring when the latter is stretched and to remain there jammed between said windings.

The aim of this invention is to allow the rollers to bend without necessity of increasing substantially in length.

To that end, the rollers are, according to the invention, supported on their ends so that the latter can move, in a plane perpendicular to the running direction of the belt, under the action of the load carried by the same.

In one preferred embodiment of the invention, the bearings or supports at the ends of the rollers are flexible in a plane perpendicular to the running direction of the belt.

Unextensible rollers may be used, but it is sufficient when the force needed to stretch them to an appreciable extent is distinctly greater than the force needed to draw closer to each other the ends of the rollers.

The rollers have preferably a smooth surface.

Other details and features of the invention will appear in the course of the following description of the accompanying drawing showing by the way of a non-limitative example a specific embodiment of this invention.

Figure 1 of said drawing is a perspective view, some parts being broken away, of a belt conveyer according to the invention, the belt running empty.

Figure 2 is a perspective view, some parts being broken away, of the belt conveyer shown on Figure 1, the belt being loaded.

Figure 3 is a sectional detail view, drawn at a larger scale, of the end of a roller.

The conveyer shown on the drawing comprises a belt 2 running on flexible supporting rollers such as shown at 3.

Said rollers are of rubber and have a smooth surface. They are supported by sheet iron members such as 4, which can yield only in a plane perpendicular to the running direction of belt 2.

In order to reduce the force needed for bending the rollers, these are made hollow. To avoid their flattening they can be reinforced or strengthened, for example by arranging a metallic spiral against the inner rubber surface. Cups or sockets 5 of ball bearings 6 are imbedded or countersunk by moulding in the ends of each roller. Said ball bearings enhance the free rotation of rollers 3 on journals such as 7.

The ends 8 of journals 7 are hooked in the upper part 9 of members 4. The damaged or worn out rollers may thus very easily be replaced.

An inextensible connection member or tie 10 unites the ball bearing sockets 5 of a same roller. Said connecting member assures the roller against extensibility and anchors the ball bearing sockets.

If desired, the bending of the rollers can be limited to a maximum predetermined value, for example by means of an abutment.

The rollers just described offer many advantages. Indeed, they allow the belt to run flat when not loaded (see Figure 1) or to assume a trough shape corresponding to the load 11 it carries (see Figure 2).

Owing to the flexibility of the rollers, the belt is supported on every point. It cannot deviate for, because of the shape of their supports, the rollers are allowed to bend only in a plane perpendicular to the running direction of the belt.

Finally, because of the smooth surface of the rollers and their flexibility the material transported can not adhere to the rollers and cause jamming, deviating or excessive wear of the belt.

The use of rubber for the rollers is quite favourable in chemical industries as it allows avoiding corrosion of the rollers.

The above described belt conveyer is only one specific embodiment of the invention. Various changes might be made to it without departing from the scope of the invention.

The rollers should not necessarily be smooth or made of rubber. Any other convenient material could be used.

What I claim is:

1. A belt conveyer comprising a belt, flexible rubber rollers on which said belt runs, a ball bearing cup anchored in each end of each of the rollers, a ball bearing in said ball bearing cup, and means for hanging said ball bearing, for movement of the roller ends in a plane perpendicular to the running direction of the belt under the action of the load carried by said belt.

2. A belt conveyer comprising a belt, extensible hollow rubber rollers on which said belt runs, a ball bearing cup located in each end of each of the rollers, an inextensible connecting member extending through the inner portion of each roller and uniting the two ball bearing cups in the ends of said roller, a ball bearing in each ball bearing cup and means for hanging said ball bearing, for movement of the roller ends in a plane perpendicular to the running direction of the belt under the action of the load carried by said belt.

HENRI HOECK.